United States Patent
Kovacevich

(10) Patent No.: US 7,496,469 B2
(45) Date of Patent: *Feb. 24, 2009

(54) TEMPERATURE SENSOR ADAPTORS AND METHODS

(75) Inventor: Steven Anthony Kovacevich, Mindoro, WI (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 251 days.

This patent is subject to a terminal disclaimer.

(21) Appl. No.: 11/437,947

(22) Filed: May 19, 2006

(65) Prior Publication Data

US 2007/0268957 A1 Nov. 22, 2007

(51) Int. Cl.
*G01K 1/00* (2006.01)
(52) U.S. Cl. ..................................... 702/130
(58) Field of Classification Search ............... 702/127, 702/189, 130, 133; 374/134
See application file for complete search history.

(56) References Cited

U.S. PATENT DOCUMENTS

| | | | |
|---|---|---|---|
| 3,761,741 A | 9/1973 | Hoeft | |
| 4,023,094 A | 5/1977 | Adams | |
| 4,096,852 A | 6/1978 | Adams | |
| 4,198,849 A | 4/1980 | Siess et al. | |
| 4,204,429 A | 5/1980 | Shimazaki et al. | |
| 4,206,646 A | 6/1980 | Spellman et al. | |
| 4,206,648 A | 6/1980 | Robbi et al. | |
| 4,211,113 A | 7/1980 | Harrison | |
| 4,296,632 A | 10/1981 | Bloomer et al. | |
| 4,339,677 A | 7/1982 | Hoeft | |
| 4,395,643 A | 7/1983 | Lehmann | |
| 4,576,487 A | 3/1986 | Conover, Jr. et al. | |
| 4,669,049 A | 5/1987 | Kosednar et al. | |
| 4,713,967 A | 12/1987 | Overs et al. | |
| 4,730,114 A | 3/1988 | Portmann | |
| 4,774,838 A | 10/1988 | Rickson et al. | |
| H0562 H | 12/1988 | Trachier et al. | |

(Continued)

FOREIGN PATENT DOCUMENTS

EP 0145935 6/1985

(Continued)

OTHER PUBLICATIONS

Analog Applications Journal, Texas Instruments Incorporated; "Sensor to ADC—analog interface design", Ron Mancini, May 2000, pp. 22-25.

(Continued)

*Primary Examiner*—Bryan Bui
*Assistant Examiner*—Stephen J Cherry
(74) *Attorney, Agent, or Firm*—Brinks Hofer Gilson & Lione

(57) ABSTRACT

A temperature sensor adaptor assembly and method having a conversion circuit configured for receiving an input characteristic of an input temperature sensor and generating a pulse width signal having a pulse width that varies in response to the received input characteristic. The assembly also includes an output circuit coupled to the conversion circuit for receiving the pulse width signal, coupled to an output, and configured for providing an impedance at the output responsive to the pulse width of the received pulse width signal. The provided impedance at the output corresponds to an impedance of a synthesized temperature sensor that is different from the input temperature sensor.

37 Claims, 7 Drawing Sheets

U.S. PATENT DOCUMENTS

| | | | |
|---|---|---|---|
| 4,916,643 | A | 4/1990 | Ziegler et al. |
| 5,065,132 | A | 11/1991 | Taddiken et al. |
| 5,066,140 | A * | 11/1991 | Beran .................. 374/134 |
| 5,161,892 | A | 11/1992 | Shiigezawa et al. |
| 5,161,893 | A | 11/1992 | Shigezawa et al. |
| 5,198,700 | A | 3/1993 | Whiteside |
| 5,282,685 | A | 2/1994 | Koegler |
| 5,483,190 | A | 1/1996 | McGivern |
| 5,539,672 | A | 7/1996 | Mullin et al. |
| 5,663,899 | A | 9/1997 | Zvonar et al. |
| 5,735,605 | A | 4/1998 | Blalock |
| 5,929,344 | A | 7/1999 | Hays et al. |
| 5,933,039 | A | 8/1999 | Hui et al. |
| 6,068,400 | A | 5/2000 | Nelson et al. |
| 6,412,977 | B1 | 7/2002 | Black et al. |
| 6,426,680 | B1 | 7/2002 | Duncan et al. |
| 6,438,502 | B1 | 8/2002 | Awtrey et al. |
| 6,489,856 | B1 | 12/2002 | Weigand |
| 6,587,807 | B2 | 7/2003 | Awtrey et al. |
| 6,803,829 | B2 | 10/2004 | Duncan et al. |
| 6,822,502 | B2 | 11/2004 | Soda |
| 6,824,307 | B2 | 11/2004 | Vail et al. |
| 6,859,051 | B1 | 2/2005 | Poulis et al. |
| 6,873,545 | B2 | 3/2005 | Johnson |
| 6,911,848 | B2 | 6/2005 | Vinciarelli |
| 6,921,198 | B2 | 7/2005 | Gruszecki |
| 6,942,382 | B2 | 9/2005 | Demeocq |
| 6,965,815 | B1 | 11/2005 | Tompkins et al. |
| 6,976,052 | B2 | 12/2005 | Tompkins et al. |
| 2001/0052814 | A1 | 12/2001 | Takita |
| 2004/0006337 | A1 | 1/2004 | Nasab et al. |
| 2007/0271072 | A1 * | 11/2007 | Kovacevich .................. 702/189 |

FOREIGN PATENT DOCUMENTS

| | | |
|---|---|---|
| GB | 2215150 | 1/1989 |
| JP | 60181802 | 9/1985 |

OTHER PUBLICATIONS

Application Report, Texas Instruments, "Thermistor Temperature Transducer to ADC Application", John Bishop, Sep. 2000, pp. 1-8.

Amplifiers: Op Amps, Texas Instruments Incorporated, Thermistor Temperature Transducer-to-ADC application, John Bishop, Nov. 2000, pp. 44-47.

Amplifiers: Op Amps, Texas Instruments Incorporated, Active Filters Using Current-Feedback Amplifiers, Randy Stephens, 3$^{rd}$ quarter 2004, pp. 21-28.

Application Report, Texas Instruments, "Improving MSC120x Temperature Measurements," Anderson & Gurevich, Dec. 2004, pp. 1-7.

Burr-Brown Products from Texas Instruments; "Precision, Analog-to-Digital Converter (ADC) and Digital-to-Analog onverter (DAC) with 8051 Microcontroller and Flash Memory," pp. 1-75 w/2 addendums, © 2004-2005.

Product Folder: TLV2252-Dual Rail-to-Rail Low Voltage Low Power Operational Amplifier, Texas Instruments Incorporated, Mar. 16, 2001, http://focus.ti.com/docs/pro/folders/print/tlv2252.html.

Product Folder: MSC1202Y2-8051 CPU with 4kB Memory, Jan. 2005, http://focus.ti.com/docs/pro/folders/print/msc1202y2.html.

MSC1201/02EVM User's Guide, Texas Instruments, Apr. 2005, pp. 1-23.

International Search Report—PCT/US2007/012181.

International Search Report—PCT/US2007/012180.

* cited by examiner

TEMPERATURE SENSOR ADAPTORS AND METHODS

FIELD

The present disclosure relates to temperature sensors and, more specifically, to circuits for interfacing temperature sensors to temperature measurement instruments.

BACKGROUND

The statements in this section merely provide background information related to the present disclosure and may not constitute prior art.

Temperature sensors are used in a wide variety of operational environments to monitor operating and environmental characteristics. They are placed in or associated with the operational environment being monitored and are designed for generating an electrical signal or having an electrical characteristic such as an impedance, voltage or current that varies in response to the changes in the temperature of the monitored operating environment.

Typically, temperature sensors are designed for particular operational environments and for particular operating ranges based on a trade off between performance over the range of the characteristic to be monitored and costs. Some temperature sensors have high sensitivity with narrow monitoring ranges, while others have less sensitivity but with broader monitoring ranges. Additionally, some temperature sensors are designed for harsh environments that provide for sensing of the operating characteristics without requiring constant replacement. For example, thermistors and resistance temperature detectors (RTD) have impedances including resistances that vary as a function of temperature and are often utilized temperature measurement. These devices utilize semi-conductor devices that can be prone to failure in a harsh operating environment. Additionally, thermistors can be extremely sensitive but typically are only linear over a narrow temperature range. In contrast, thermocouples generate an output voltage, due to the well known Seebeck Effect, and can have a wide linear temperature detection range. The designs of thermocouples enable them to be placed in harsh environments, but are generally less costly than thermistors.

Temperature sensors are typically coupled to a measurement instrument or device adapted for receiving or determining the sensor provided characteristic and, in response, determining the value of the monitored operating characteristic. For example, a temperature measurement instrument includes an interface and temperature measurement hardware and software for receiving or determining a value of a characteristic of a temperature coupled thereto and determining a temperature measured by the temperature sensor. Each measurement instrument is designed and configured for a particular type of sensor such as the various types of thermocouples, thermistors, RTDs, pressure sensors, and motion detections, by way of example. For temperature measurement, one common type of measurement instrument is configured for determining a sensed temperature from an RTD temperature sensor. While some measurement instruments are configurable or selectable between sensor types, it is common for each to be specialized for the particular type of sensor.

However, the operators of measurement systems having measurement instruments and sensors would often like to utilize a different type of temperature sensor without having to change out or modify the measurement instrument. For example, an operator may desire to sense a temperature with a thermocouple even though the operations system is already equipped with temperature measurement systems designed for resistance-type temperature sensors such as a particular type of RTD or thermistor. In the alternative, the operational environment may be configured for use with a thermocouple, and the operator may desire to utilize a resistance-type of temperature measurement instrument.

SUMMARY

The inventor hereof has succeeded at designing circuits, assemblies, systems and methods for adapting a temperature sensor or a temperature measurement instrument to interface with a device that is different than that which it was designed to interface while still enabling the proper monitoring or detection within the operational environment. In some embodiments, this can provide for reliable and cost effective systems and methods for adapting a temperature sensor to a temperature measurement instrument that was designed to interface with a different type of temperature sensor and to improve the sensitivity or range of the temperature sensor.

According to one aspect, a temperature sensor adaptor assembly includes a conversion circuit configured for receiving an input characteristic of an input temperature sensor and generating a pulse width signal having a pulse width that varies in response to the received input characteristic. The assembly also includes an impedance circuit coupled to the conversion circuit for receiving the pulse width signal, coupled to an output, and configured for providing an impedance at the output responsive to the pulse width of the received pulse width signal. The provided impedance at the output corresponds to an impedance of a synthesized temperature sensor that is different from the input temperature sensor.

According to yet another aspect, a temperature sensor adaptor system includes an input for receiving an electrical signal from a thermocouple and an output for coupling to an input of a temperature measurement instrument that is configured for receiving an input from an impedance temperature sensor for determining a sensed temperature. The assembly also includes a processor coupled to the input for receiving the electrical signal and is configured for generating a pulse width signal having a pulse width that varies in response to the received electrical signal. A control circuit is coupled to the processor and is configured for receiving the pulse width signal and converting the pulse width signal into a control signal responsive to the pulse width of the received pulse width signal. An impedance device is coupled to the control circuit for receiving the control signal and is configured for providing an impedance at the output responsive to the control signal and that corresponds to an impedance of an impedance-based temperature sensor.

According to another aspect, a temperature sensor adaptor circuit includes means for converting an input characteristic received at an input from a temperature sensor configured for sensing a temperature into a pulse width signal having a pulse width that varies in response to the received input characteristic, and means for providing an output characteristic at an output corresponding to a characteristic of a synthesized temperature sensor and responsive to the pulse width of the pulse width signal, said synthesized temperature sensor being different from the input temperature sensor.

According to still another aspect, a method of sensing a temperature includes receiving a voltage generated by a thermocouple sensing an operating temperature, generating a pulse width signal having a pulse width that varies in response to the received voltage, and providing an impedance at an output that varies in response to the pulse width of the pulse width signal and that corresponds to an impedance of an impedance-based temperature sensor sensing the operating temperature.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

In one embodiment, an electronic adaptor assembly includes a conversion circuit and an output circuit. The conversion circuit is coupled to an input and configured for receiving an input characteristic of an input device that is also coupled to the input. Typically, the input device is positioned to provide the input characteristic and the value of the characteristic associated with an operation of and/or the environment about the input device. The input device can be any type of input sensing device including a temperature sensor, a humidity sensor, a velocity sensor, a pressure sensor, a flow sensor, a motion sensor, a voltage sensor, a current sensor, and an impedance sensor, by way of example. The conversion circuit generates a pulse width signal having a pulse width that varies in response to the received input characteristic. The output circuit is coupled to an output and to the conversion circuit and configured for receiving the pulse width signal and providing a characteristic at the output that varies in response to the pulse width of the pulse width signal. The characteristic at the output corresponds to a characteristic of a synthesized device that is different from the input device. The synthesized device can be any type of device for which synthesization at the output is desired and can include a temperature sensor, a humidity sensor, a velocity sensor, a flow sensor, a motion sensor, a pressure sensor, a voltage sensor, a current sensor, and an impedance sensor, by way of example. The value of the characteristic is generally provided to be the value that would be provided by the synthesized device had the synthesized device been positioned and utilized in place of the input device.

Figure 1:
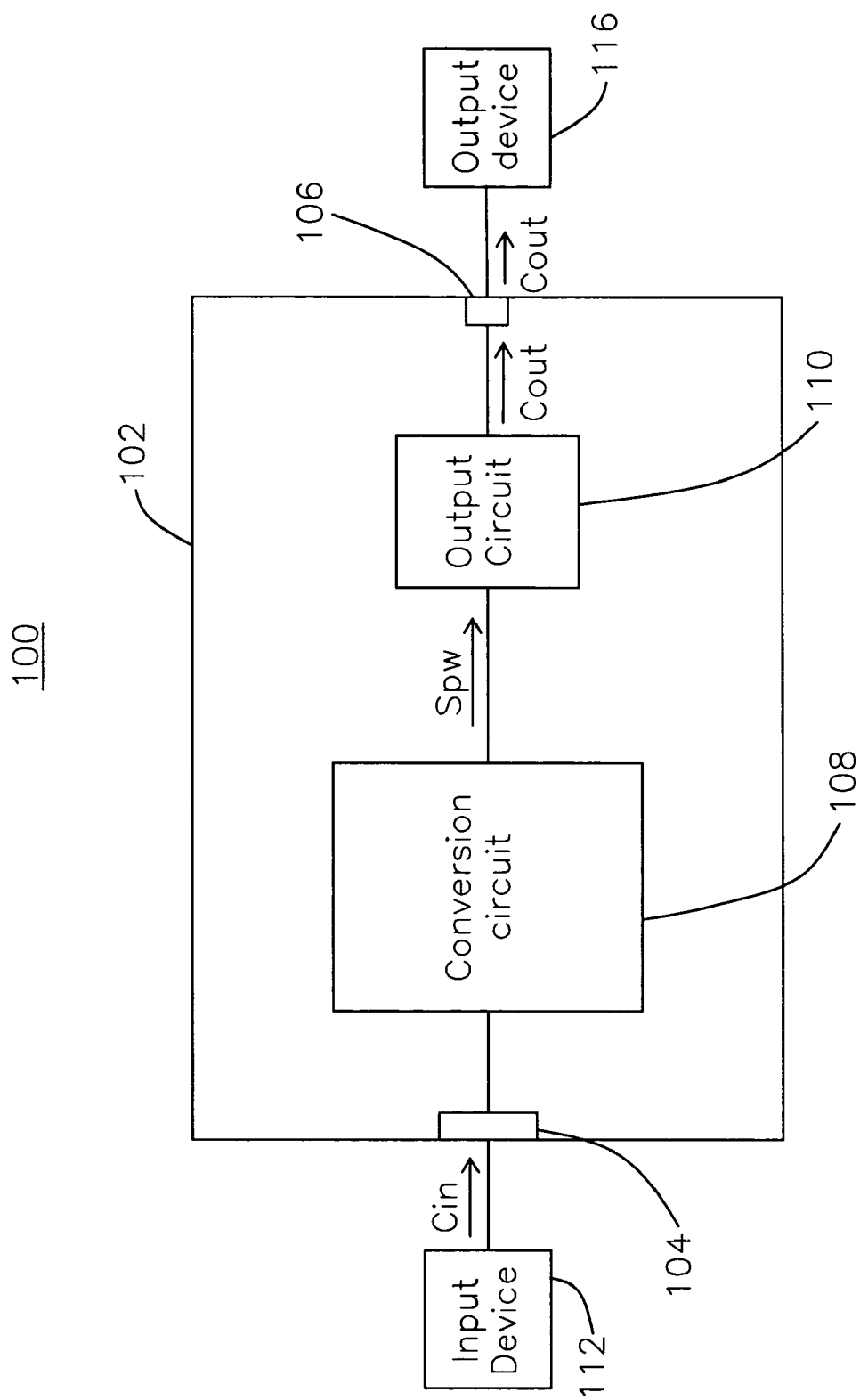
FIG. 1 is a block diagram of a sensor adaptor system having a sensor adaptor circuit interfacing between an input device and an output device according to one exemplary embodiment.

Referring to FIG. 1, one exemplary electronic adaptor system 100 includes a sensor adaptor circuit 102 with an input 104 and an output 106. A conversion circuit 108 is coupled to the input 104. An output circuit 110 is coupled to the output 106. An input device 112, such as a sensor, is coupled to the input 104. An output device 116, such as a measurement instrument, is coupled to the output 106.

The input device 112 can be any type of device and can include a temperature sensor, a humidity sensor, a velocity sensor, a pressure sensor, a flow sensor, a motion sensor, a voltage sensor, a current sensor, and an impedance sensor. Generally, the input device 112 provides an input characteristic $C_{in}$ to the input 104. The input device 112 generates a characteristic such as an analog signal having a voltage or current value that varies in time or based on particular operating or sensed characteristic. In other embodiments, the input device 112 can provide an impedance characteristic (and used generally herein to include a basic resistance or a complex impedance) in response to an externally provided voltage or current, such as one provided by the sensor adaptor circuit 102. The input 104 is configured to receive the input characteristic $C_{in}$ from the input device 112 and provides it to the conversion circuit 108.

The conversion circuit 108 receives the input characteristic $C_{in}$ and generates a pulse width signal $S_{pw}$ having a pulse width that varies as a function of the received input characteristic. The pulse width signal $S_{pw}$ can be a digital signal or an analog signal. The conversion circuit 108 can determine the appropriate pulse width for the pulse width signal $S_{pw}$ in a variety of different manners and based on a variety of different processes as will be discussed in greater detail below. In summary here, the conversion circuit 108 determines the pulse width for the pulse width signal $S_{pw}$ based on one or more of the input characteristics, a determined value for an operating characteristic associated with input device 112, the output circuit 110 and its functionalities and capabilities, and one or more characteristics of a synthesized device (not shown). The operating characteristic can be any characteristic and can include a temperature, a pressure, a humidity, a flow, a movement, and a velocity. The synthesized device is a device for which an output characteristic $C_{out}$ is synthesized by the output circuit had the synthesized device originally sensed the operating characteristic rather than having been sensed by the input device 112. For example, the conversion circuit 108 and output circuit 110 are configured for generating the pulse width signal $S_{pw}$ having a pulse width corresponding to the synthesized characteristic of the synthesized device detecting the operating characteristic as detected by the input device 112.

The output circuit 110 receives the pulse width signal $S_{pw}$ generated by the conversion circuit 108 and provides the output characteristic $C_{out}$ at the output 106 and/or to the output device 116. It should be noted here, that throughout the disclosure, the input characteristics $C_{in}$, the pulse width of pulse width signal $S_{pw}$, the output characteristic $C_{out}$, changes to these or dependencies of these vary by changes in the characteristics and/or values of the characteristics and the present description is intended to cover both interpretations, even though not stated as such. As such, the value of the output characteristic can change as a function or responsive to a change in value of the input characteristic, and/or the value operating characteristic, and the "value" of the characteristic is implied, though not specifically stated or recited in all descriptions.

As addressed further below, the electronic adaptor circuit 102 can receive a plurality of input characteristics $C_{in}$ from a plurality of input devices 112, and determine a single output characteristic $C_{out}$ as a function of the plurality of input characteristics $C_{in}$. The determination of the appropriate pulse width and therefore the output characteristic $C_{out}$ can include a computation, an averaging, an algorithm, and a mapping, by way of examples, such that the output characteristic $C_{out}$ is determined from a plurality of input characteristics $C_{in}$ or measurements.

By way of further example of a specific type of electronic adaptor assembly shown in FIG. 1, the electronic adaptor assembly can be a temperature sensor adaptor assembly. In the temperature sensor adaptor assembly embodiments, the conversion circuit 110 configured for receiving an input characteristic of an input temperature sensor (e.g., input device 112 of FIG. 1) that detects a temperature of an operating environment and generates a temperature characteristic. The temperature characteristic can be any type of characteristic and includes voltage, current, and resistance, by way of examples. Generally, the input characteristic provided by the input temperature sensor varies as a function of the operating temperature based on the characteristic to temperature profile of the input temperature sensor. The conversion circuit 110 correlates the received input characteristic of the input temperature sensor to determine a pulse width that will cause the impedance circuit at the output to provide an output impedance that corresponds to an impedance of a desired synthesized device. The conversion circuit 110 generates a pulse width signal having a pulse width that varies in response to the input characteristic of the input temperature sensor and that will result in the synthesized impedance value. The temperature sensor adaptor assembly embodiment also includes an output impedance circuit (as the out circuit 110) coupled to the conversion circuit 110 and that receives the pulse width signal $S_{pw}$. The output impedance circuit provides a synthesized impedance as the output characteristic $C_{out}$ at the output 106 responsive to the pulse width of the pulse width signal $S_{pw}$ and corresponding to the impedance of the synthesized temperature sensor.

Generally, in this exemplary embodiment, the input temperature sensor can be any type of temperature sensor providing any type of input characteristic $C_{in}$, including voltage, current, and impedance, by way of examples. The synthesized sensor can be any type of impedance varying type of temperature sensor such as any type of thermistor or RTD. This exemplary embodiment receives the input characteristic $C_{in}$ from the input temperature sensor and adapts it to have an impedance value that correlate to and/or to have the same impedance profile (e.g., impedance as a function of temperature) as the synthesized temperature sensor. Additionally, those skilled in the art will understand that the profiles of the synthesized device can be based on actual devices or can be profiles of improved performance or enhanced devices, such as devices that have a greater bandwidth of linearity in it output characteristic to operating characteristic profile. In this manner, the adaptor circuit adapts the temperature sensor to be the output of a known or improved synthesized temperature sensor sensing the same temperature thereby enabling the input sensor to interface with a temperature measurement system or instrument that is adapted for receiving the impedance value associated with the profile of the synthesized temperature sensor.

Figure 2:
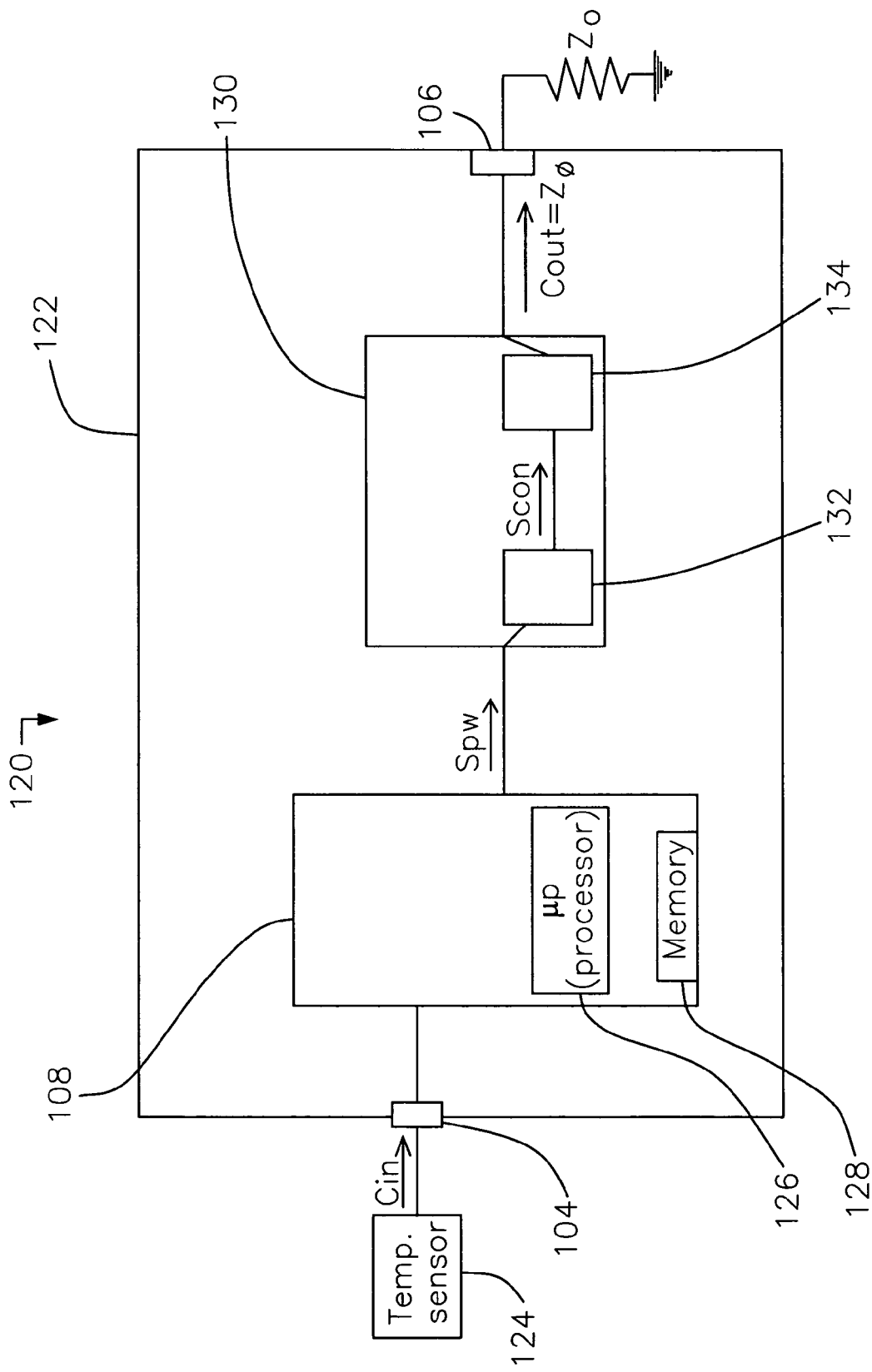
FIG. 2 is a block diagram of a temperature sensor adaptor system having a temperature sensor adaptor circuit interfacing receiving an input characteristic from an input temperature sensor and providing an output impedance according to another exemplary embodiment.

One example of a temperature sensor adapting system 120 is illustrated in FIG. 2. As shown, a temperature sensor adaptor circuit 122 is one example of the electronic adaptor circuit 102 of FIG. 1 configured for receiving the input characteristic $C_{in}$ from a temperature sensor 124, which is the input device 112 in this example. The temperature sensor 124 can be a thermocouple providing a voltage or current to the input 104, or can be an impedance-type temperature measurement device such as a thermistor or an RTD. In the later case of an impedance-type sensor, the temperature sensor adaptor circuit 122 can provide an enabling or biasing voltage or current via input 104 to the impedance-type temperature sensor 124 device for determining the provided value of the impedance input characteristic $C_{in}$. The output circuit 110, in this illustrated embodiment, is an output impedance circuit 130.

The conversion circuit 108 can include one or more processors 126 such as any known type of processing chip or system and can include a digital signal processor (DSP). Additionally, a memory 128 can be associated with the processor 126 or can be included with the processor 126. One exemplary computer operating environment for the conversion circuit 108 is provided below with regard to FIG. 7. In one embodiment, the conversion circuit 108 is programmable with computer executable instructions stored or provided on a computer readable medium, and configured to determine a sensed temperature as a function of the temperature input characteristic $C_{in}$.

In one embodiment, the conversion circuit 108 includes one or more analog-to-digital converters (ADC). An analog input signal is received from the temperature sensor 124 including the input characteristic $C_{in}$ and is converted from analog to digital by the ADC. The digitized input signal can then be digitally processed to determine, by way of example, the operating characteristic value as sensed by the temperature sensor 124. One or more reference signals, such as a DC reference voltage, can also be converted to a digital signal. The digitized reference signals can also be modified by a linear compensation function.

The conversion circuit 108 can utilize the determined operating characteristic value and the modified reference signal to determine the appropriate value of the output characteristic $C_{out}$ associated with the synthesized device. Additionally the conversion circuit 108 can determine the required pulse width of the pulse width signal $S_{pw}$ so as to provide the output characteristic value at the output 106 by the output impedance circuit 130, e.g., output circuit 110. The pulse width can be determined by the processor 126 utilizing computer instructions, one or more algorithms, fables, maps, processes, by way of examples, in order to control the output impedance circuit 130 to provide the particular value of an output impedance $Z_o$ corresponding to the synthesized device. In some embodiments, the conversion circuit 108 is configured to utilize models of the synthesized device, the output characteristic $C_{out}$ to operating characteristic profile or algorithm of the synthesized device, and/or the characteristics and/or profile of the impedance circuit 130, and components thereof, as functions of the provided pulse width of the pulse width signal $S_{pw}$. The conversion circuit 108 can be user adaptable via a user or programming interface to a variety of different types of temperature sensors 124 in various operating environments, and to a variety of synthesized devices. These models define known device profiles and performances, and can also be modified to improve sensitivity, linear bandwidth and/or performance as the synthesized device can be a theoretical device. In this manner, the adaptor circuit 102 can be attractive for a wide range of applications including enhancing the performance characteristics where the synthesized device is an improved performance model of the temperature sensor 124. For example, the adaptor circuit 102 can be utilized to improve the linearity of the temperature sensor 124 over ranges where the temperature sensor 124 is typically non-linear. As such, the temperature sensor 124 can be selected based on cost, availability, or performance in the operating environment.

After the conversion circuit 108 has determined the appropriate pulse width to provide the synthesized output characteristic $C_{out}$, such as the output impedance $Z_o$, the conversion circuit 108 generates the pulse width signal $S_{pw}$ having the determined pulse width. The impedance circuit 130 includes a control circuit 132 that is configured to receive the pulse width signal $S_{pw}$ and to generate a control signal $S_{con}$. The control signal $S_{con}$ can be any type of electrical signal and can include a direct current voltage and/or current signal, by way of example. The control circuit 132 can include one or more operational amplifiers, integrators or integration circuits, and/or one or more filters, such as a linear filter.

An output device 134, such as a variable impedance device, is coupled to the output 106 such that the output characteristic $C_{out}$ of the output 106 is varied by the output device 134. The output device 134 can provide an output impedance $Z_o$, output voltage, or output current, that varies in response to the control signal $S_{con}$. For example, the output device 134 can include a semiconductor or transistor and, in one embodiment, is a field effect transistor (FET) such as a metal oxide field effect transistor (MOSFET). In the latter case, the control signal $S_{con}$ can be a biasing voltage coupled to a gate on the MOSFET and the output characteristic $C_{out}$ can be the impedance $Z_o$ between the source and the drain that varies as a function of the activation of the gate responding to the control signal $S_{con}$ voltage. In other embodiments, the output circuit 110 can include a voltage or current source and a variable voltage device or a variable current device for synthesizing a synthesized temperature sensor that provides a voltage or current that varies in response to the input characteristic $C_{in}$ such as temperature.

Of course, as understood by those skilled in the art, the conversion circuit 108 and the impedance circuit 130 can include fewer or more circuit components as described herein and still be within the scope of the present disclosure. By way of example, as described below, one or more feedback signals can be provided to the conversion circuit 108 for inclusion in the determination of the appropriate pulse width of the pulse width signal $S_{pw}$ or to the impedance circuit 130 for the determination of the control signal $S_{con}$ for controlling an output circuit 110, such as the impedance circuit 130. These will be discussed is greater detail below with regard to FIGS. 4-6.

Figure 3:
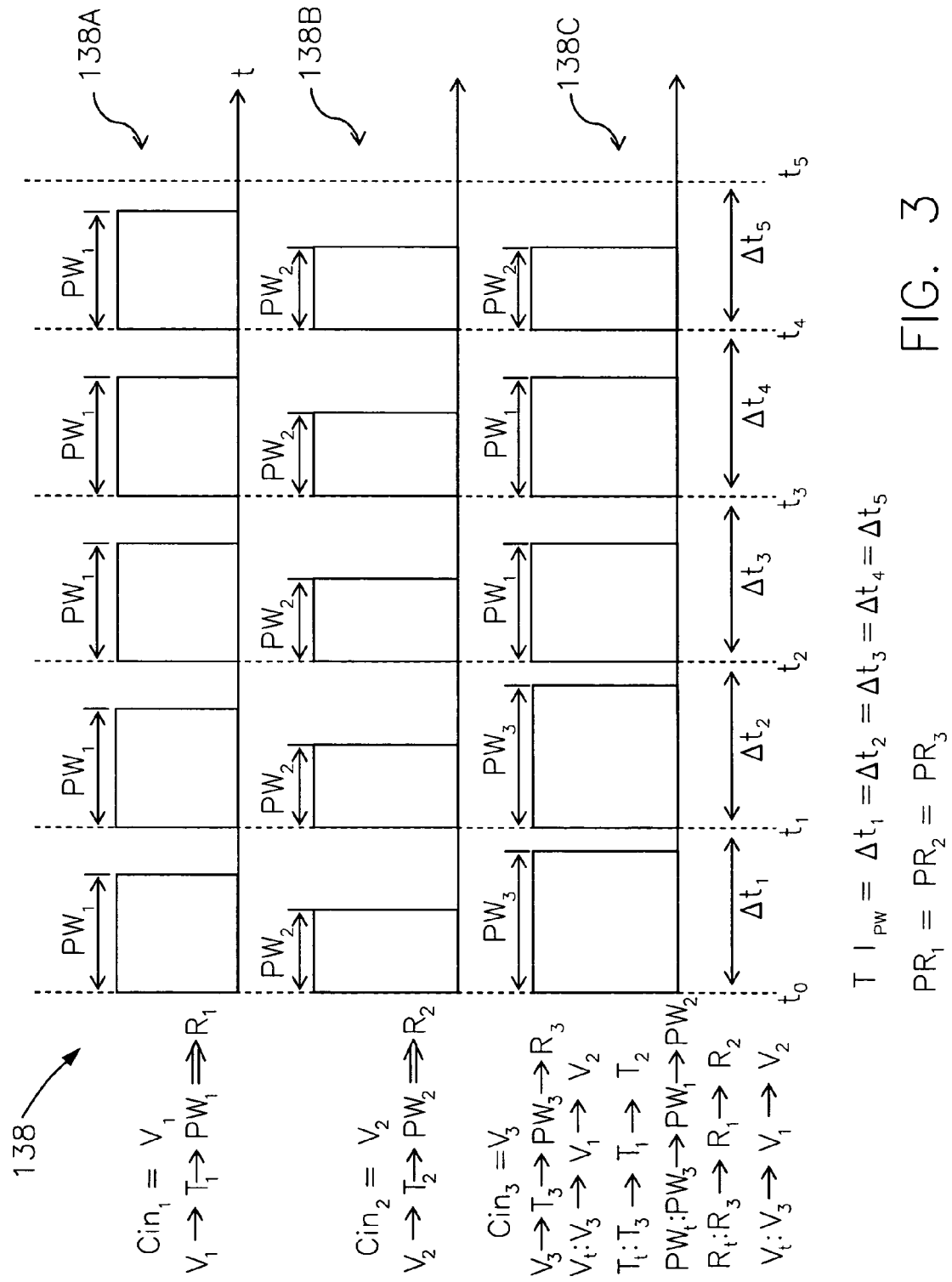
FIG. 3 is a graphical illustration of three pulse width signals according to various exemplary embodiments.

Referring now to FIG. 3, a timing diagram 138 illustrates the pulse width signal $S_{pw}$ having the pulse width that varies in response to the input characteristic $C_{in}$, e.g., the width of the pulses of the pulse width signal vary as a function of the value of the input characteristic $C_{in}$ provided by the input device 112, such as described above as temperature sensor 124, by way of example. In this example, the first pulse diagram 138A illustrates a first input characteristic $C_{in1}$ as a first voltage $V_1$. The conversion circuit 108 receives the first voltage $V_1$, determines a first temperature $T_1$, and then determines the first pulse width $PW_1$ that corresponds to the first voltage $V_1$ and/or the first temperature $T_1$. The first pulse width signal $S_{pw1}$ having the first pulse width $PW_1$ is illustrated in the signal diagram 138A having a pulse timing interval of $TI_{pw}$ and a pulse rate of $PR_1$ (pulse rate herein describes the timing rate of the pulses, which can also be viewed as the frequency of the pulses). While the pulse rate PR can vary in some embodiments, in one preferred embodiment the pulse rate PR is substantially constant over time and generally independent of the received input characteristic $C_{in}$. As indicated on the left of signal diagram 138A, the first pulse width $PW_1$ provides for a first output resistance $R_1$.

Next, a second input characteristic $C_{in2}$ is received that has a second voltage $V_2$ that is less than the first voltage $V_1$. The conversion circuit 108 receives the second voltage $V_2$, determines a second temperature $T_2$, and then determines the second pulse width $PW_2$ that corresponds to the second voltage $V_2$ and/or the second temperature $T_2$. The second pulse width signal $S_{pw2}$ is illustrated in signal diagram 138B having the pulse timing interval of $TI_{pw}$ and a pulse rate of $PR_2$, which can be equal to the first bit rate $PR_1$ in some embodiments. The second pulse width $PW_2$ is less than the first pulse width $PW_1$ because the second voltage $V_2$ is less than the first voltage $V_1$. If should be understood, however, that in some embodiments the pulse width can increase as the value of the input characteristic decreases, and still be within the scope of the disclosure.

The signal diagram 138C illustrates a change of the input characteristic $C_{in}$, in this example, voltage V, over time. As shown, the input characteristic $C_{in}$ starts as a first voltage value $V_3$ that is greater than $V_1$ and $V_2$. The third voltage $V_3$ results in a determination of a third Temperature $T_3$, a third pulse width $PW_3$ and a third output characteristic value of a resistance $R_3$. As the input characteristic $C_{in}$ changes from third voltage $V_3$ to first voltage $V_1$, the determined temperature changes to first Temperature $T_1$, and results in the first pulse width $PW_1$ being generated. From the first pulse width $PW_1$, the output circuit 110, such as impedance circuit 130, by way of example, generates the first output resistance $R_1$. Next, as the input characteristic $C_{in}$ changes from first voltage $V_1$ to the second voltage $V_2$, the determined temperature changes to second Temperature $T_2$, and results in the second pulse width $PW_2$ being generated. From the second pulse width $PW_2$, the output circuit 110 generates the second output resistance $R_2$. As such, it can be seen that the width of the pulses changes as a function of the received input characteristic $C_{in}$ (such as a function of the value of the input characteristic $C_{in}$) and/or the determined Temperature T. Additionally, the output characteristic $C_{out}$, such as the impedance or resistance, changes as a function of the pulse width.

Figure 4:
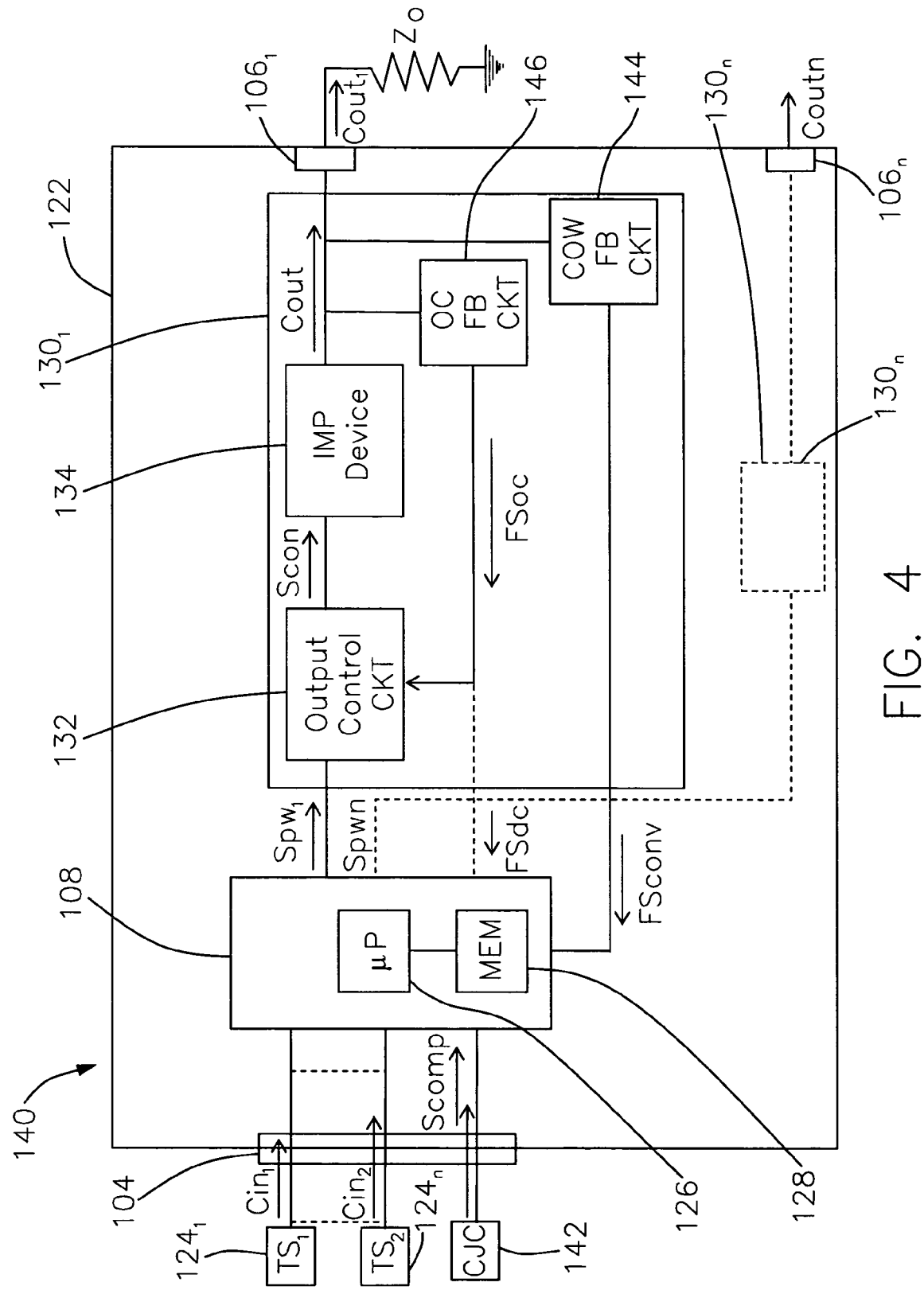
FIG. 4 is a block diagram of a temperature sensor adaptor system for interfacing with a plurality of temperature sensors and for providing a variable impedance output according to yet another exemplary embodiment.

Referring now to FIG. 4, an adaptor system 140 is another exemplary embodiment of the electronic adaptor circuit 102, and more specifically, another exemplary embodiment of the temperature sensor adaptor circuit 122. As shown, a plurality of temperature sensors 124 (shown as $124_1$ to $124_N$ and corresponding to input devices $112_1$ and $112_N$) are coupled to the input 104 with each providing an input characteristics $C_{in}$, shown as $C_{in1}$ to $C_{inN}$. The conversion circuit 108 receives each of the input characteristics $C_{in}$ and generates, one or more pulse width signals $S_{pw}$. In one embodiment, the conversion circuit 108 receives two or more input characteristics $C_{in}$ from two or more temperatures sensors 124 and generates a single pulse width signal $S_{pw}$ as a function of the multiple input characteristics $C_{in}$ or as a function of multiple temperatures determined from the multiple input characteristics $C_{in}$. For example, the determination of the pulse width for the pulse width signal $S_{pw}$ can be based on an averaging of the input characteristics $C_{in}$ or the determined temperatures $T_N$. In other embodiments, the pulse width can be generated from a software model related to the environment and/or the particular application and characteristics of the synthesized temperature sensor.

In yet other embodiments, the conversion circuit 108 can receive the multiple input characteristics $C_{in}$ and generate two or more pulse width signals $S_{pwN}$ with each being a function of one or a combination of more than one input characteristic $C_{in}$. In this case, the temperature sensor adaptor circuit 122 can include multiple output circuits 110, such as multiple impedance circuits 130, at multiple outputs $106_N$. Each of the multiple temperature sensors 124 or other input devices 112 can be of the same type, or of a different type. Additionally, each of the multiple temperature sensors 124 or other input devices 112 can provide the same or different input characteristic $C_{inN}$. And each of the output circuits $110_N$ can provide the same output characteristic $C_{out}$ or a different output characteristic $C_{out}$.

As also illustrated in FIG. 4, in a temperature sensing application wherein one or more of the temperature sensors 124 is a thermocouple, a cold junction compensation circuit (CJC) 142 can provide a compensation signal $S_{comp}$ to the conversion circuit 108. As is known in the art, the compensation signal $S_{comp}$ can be utilized by the conversion circuit 108 to determine the temperature T at the hot junction of the thermocouple. The conversion circuit 108 can utilize the compensation signal $S_{comp}$, at least in part, to determine the appropriate width of the pulses in the pulse width signal $S_{pw}$ to be generated to synthesize the output characteristic $C_{out}$. Of course, more than one cold junction compensation circuit 142 can provide more than one $S_{comp}$ signal, and in other embodiments, other types of input or compensation signals, other than a cold conjunction compensation signal can be provided to the conversion circuit 108 for use in generating the width of the pulses for the pulse width signal $S_{pw}$. As noted above this can also include a feedback signal.

One example of a feedback signal is generated by a conversion feedback circuit 144. The conversion feedback circuit 144 is coupled to, or is associated with, the output 106 for providing a conversion feedback signal $FS_{conv}$ to the conversion circuit 108. The conversion feedback signal $FS_{conv}$ can include a voltage, current, impedance, or more complex analog or digital signal formed from the output of the output circuit 110 that is utilized by the conversion circuit 108 in the determination of the appropriate width of the pulses of the pulse width signal $S_{pw}$ to produce the appropriate value of the output characteristic Cout to synthesize the characteristic of the synthesized device. For example, in one embodiment, the conversion feedback circuit 144 generates the conversion feedback signal $FS_{conv}$ as a current shunt or voltage shunt from the output 106 wherein the conversion feedback signal $FS_{conv}$ is utilized by the conversion circuit 108 to determine the width of the pulses of the pulse width signal $S_{pw}$.

In some embodiments, an output control feedback circuit 146 is coupled to, or associated with, the output 106 to provide an output control feedback signal $FS_{oc}$ to or within the output circuit 110 such as the impedance circuit 130. The output circuit 132 within the output circuit 110 can utilize the output control feedback signal $FS_{oc}$ in the generation of the control signal $S_{con}$ for controlling the output device 134, and/or for providing the output characteristic $C_{out}$ having the appropriate synthesized characteristic value. For example, in one embodiment the output control feedback circuit 146 provides a voltage from the output 106 as the output control feedback signal $FS_{oc}$. In one embodiment, the provided voltage is a voltage received at the output 106 from a temperature measurement instrument coupled to the output and configured for interfacing with an impedance-type temperature sensor. In other embodiments, the voltage may be generated internally to the adaptor circuit 102. By generating an output control feedback signal $FS_{oc}$ as a function of the voltage at the output 106, the output circuit 110 can adjust the control signal $S_{con}$ and therefore can adjust the provided output characteristic $C_{out}$ or values thereof, based on variations of the provided voltage. This is only one example, as the output control feedback circuit 146 can also be based on a current or the output characteristic $C_{out}$ itself, or in some cases, can be based on an external input from the measurement instrument.

The output control feedback signal $FS_{oc}$ can also be provided, in some embodiments, to the conversion circuit 108. In this manner, the conversion circuit 108 can also make adjustments to the width of the pulses of the pulse width signal $S_{pw}$ to adapt for variations of the voltage, current, impedance, or the output characteristic $C_{out}$, of the output 106. For example, this can include utilizing the output control feedback signal $FS_{oc}$ as a variable reference or reference signal for processor 126.

Figure 5:
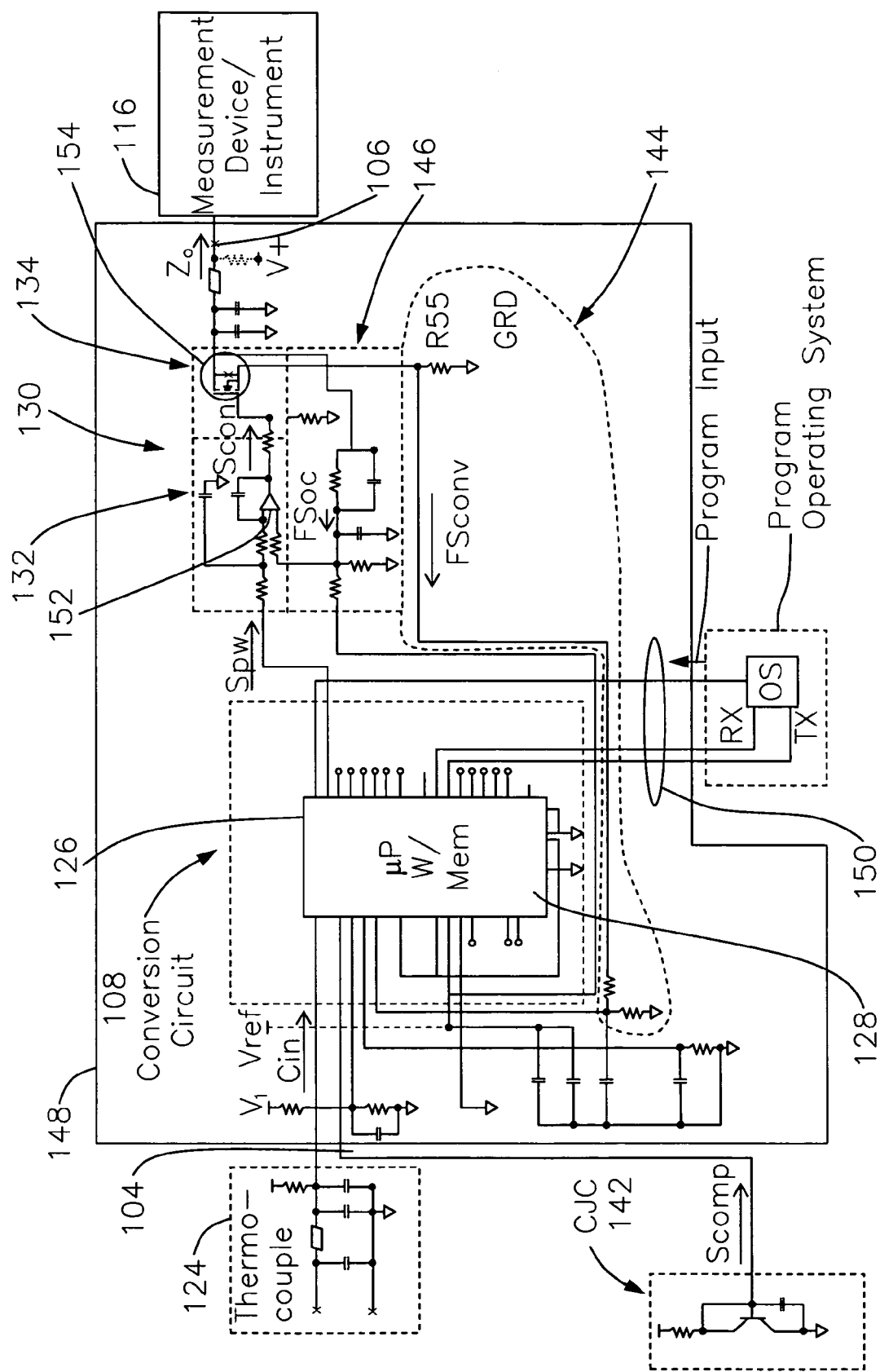
FIG. 5 is a circuit schematic of a sensor adaptor circuit according to another exemplary embodiment.

FIG. 5 illustrates one exemplary circuit diagram of an electronic adaptor circuit 102 as generally described above with regard to FIG. 6. As known to those skilled in the art, additional circuit components and/or alternative wirings and component functionality can be implemented within this circuit and still be within the scope of the present circuit disclosure. For example, there are various methods and system for appropriately biasing one or more components within a circuit and for control, programming and operation of the processor that are well known in circuit design. Additionally, while the circuit of FIG. 5 only illustrates a single input temperature sensor and a single output, the circuit can be configured to have two or more input temperature sensors and one or more outputs associated with the two or more input temperature sensors. The common components and elements are not described again herein as they are generally described with regard to FIG. 5.

The conversion circuit 108 in this embodiment includes a processing system having an integrated memory within the processor 126. Additionally, a programming interface 150 includes a plurality of inputs and outputs for operating, installing software, programming and monitoring of the processor 126 and generally the conversion circuit 108. The conversion circuit 108 can receive a reference voltage from a source external to the adaptor circuit 148 or can receive a reference voltage from within the adaptor circuit 148. For example, in one embodiment, the reference voltage is a voltage generated, at least in part, from a voltage at the output 106, such as can be provided by the output control feedback signal $FS_{oc}$.

With regard to the output circuit 110, the adaptor circuit 148 includes an output control circuit 132 including a operational amplifier (op amp) 152 configured in an integrating circuit to provide control signal $S_{con}$. The op amp is configured to receive the pulse width signal $S_{pw}$ on the inverting input to the op amp 152. The output control feedback signal $FS_{oc}$ is derived from the voltage and/or current at the output 106 and provided to the non-inverting input to the op amp 152. In this manner, the op amp 152 integrates the pulse width signal $S_{pw}$ with the output control feedback signal $FS_{oc}$ to generate the control signal $S_{con}$. The output device 134 includes a MOSFET output transistor 154 having a gate coupled to receive the control signal $S_{con}$, the drain coupled to the output 106, and the source coupled through a resistor to ground. In this manner, the control signal $S_{con}$ controls the gate that in turns controls the conductivity and therefore impedance between the drain and source, and therefore the impedance at the output 106.

A power source can also be included in the adaptor circuit 148 and associated with the output and/or coupled to the drain (shown as the dashed line receiving V+) and/or source of the transistor 154 to provide a voltage or current as the output characteristic $C_{out}$ rather than an impedance. Additionally, the pulse width signal $S_{pw}$ can also be provided as an output of the adaptor circuit 148 and provided to a measurement device 116. In such embodiments, the measurement device 116 can implement one or more of the components and functions of the output circuit 110 as described herein, or can be adapted to directly determine the operating environment characteristic from the pulse width of the pulse width signal $S_{pw}$. As noted, the adaptor circuit 148 of FIG. 5 is just one exemplary embodiment of the adaptor circuit 102 as designed and tested by the inventors. As those skilled in the art understand, various other alternative circuit designs can also be created to implement the elements of the claims and to provide similar or equivalent functionality and to perform the processes and methods as described herein. These can include one or more of the methods of operation of the present disclosure as now addressed.

Figure 6:
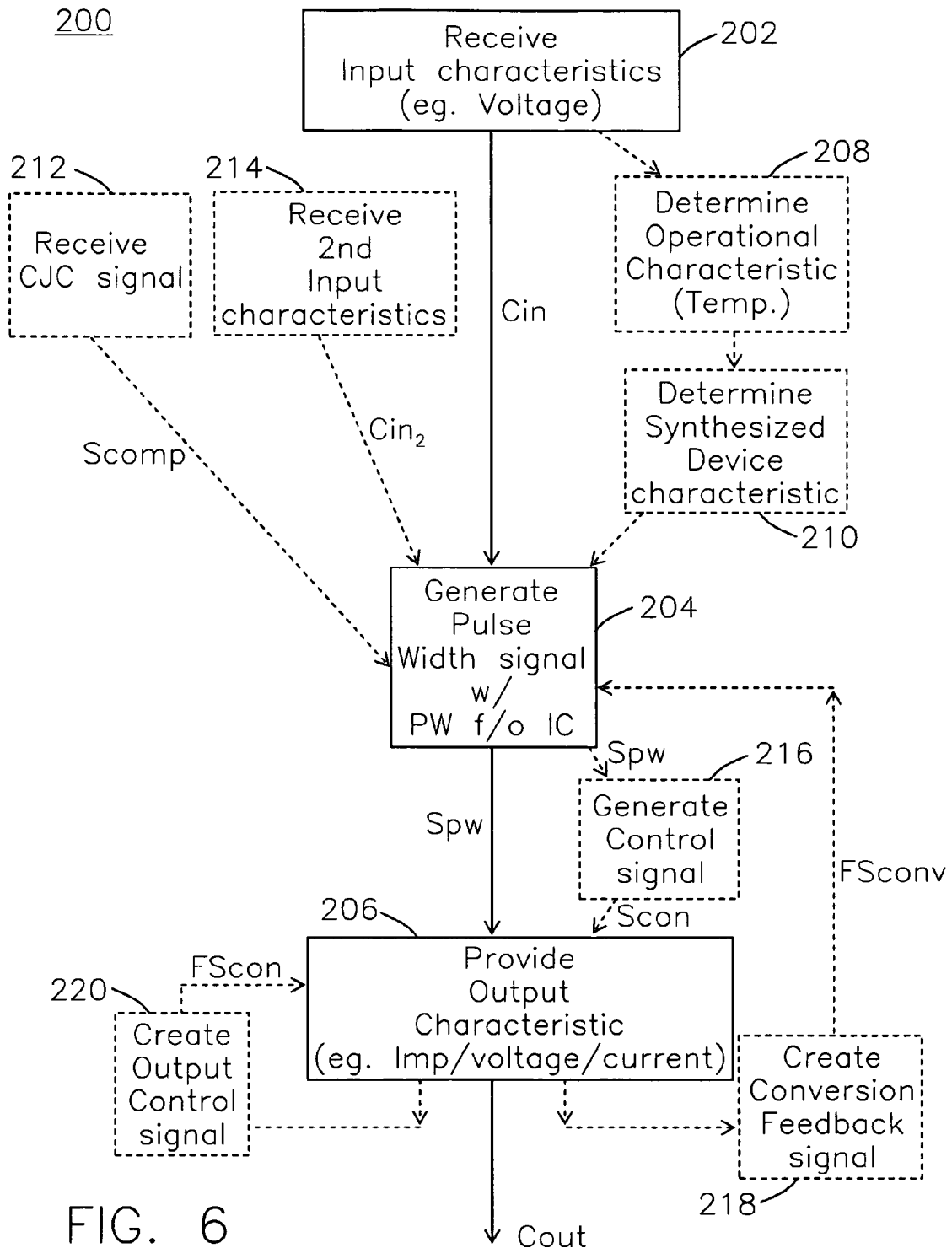
FIG. 6 is a flow diagram of a method of adapting a sensor according to one exemplary embodiment.

In operation, a method of adapting can include a method of sensing, as one exemplary adaptation implementation. As illustrated in FIG. 6, a method 200 can include receiving the input characteristic $C_{in}$ such as a voltage, current, or impedance in process 202 from an input device, such as a sensor positioned and configured for sensing an operating characteristic within an operational environment. For example, this can be a thermocouple generating a voltage due to the sensing of a temperature. The method includes generating a pulse width signal $S_{pw}$ in process 204 having a pulse width that varies in response to the received input characteristic. An output characteristic $C_{out}$ is provided in process 206 at the output 106 in response to the pulse width of the generated pulse width signal $S_{pw}$. As noted above, the output characteristic $C_{out}$, but can include impedance, voltage, and/or current. The output characteristic $C_{out}$, as provided at the output 106, corresponds to a characteristic of a synthesized sensor that can be different from the characteristic of the input device 112. The value of the output characteristic $C_{out}$ relates to the value of the characteristic of the synthesized sensor, had the synthesized sensor sensed the operating characteristic within the operational environment rather than the input device 112. One example of such adaptation, is adapting the output of a thermocouple positioned to sense an operating temperature to an impedance at the output 106 that varies as a function of the operating temperature as that that would have been provided by an impedance-type temperature sensor.

As discussed above, this method can include various other processes as identified by dashed boxes and lines in FIG. 6. As illustrated, after receiving the input characteristic in process 202, the sensed operating characteristic, such as a temperature or a pressure, can be determined, in process 208. After determining the sensed operating characteristic, the type and value of the synthesized characteristic that relates to or is associated with the sensed operating characteristic, or at least the input characteristic $C_{in}$, is determined in process 210. From these, the pulse width signal $S_{pw}$ is generated to synthesize the synthesized sensor the characterization and value at the output 106.

In some embodiments, one or more additional signals can be received by the conversion circuit 108, wherein each includes a different input characteristic provided by a different type of input device 112. For example, in a thermocouple sensing application, the method can include receiving a compensation signal $S_{comp}$ from a cold junction compensation circuit 142 as shown in process 212. As noted above, the method can include generating the pulse width of the pulse width signal $S_{pw}$ as a function of, or in response to, the received compensation signal $S_{comp}$.

In some embodiments, the method can include receiving a second input characteristic, as in process 214, from a second input sensor and generating the pulse width signal $S_{pw}$ in process 204 having a pulse width that varies in response to the received second input characteristic $C_{in2}$.

Similarly, a second value of the input characteristic $C_{in}$ can be provided such that the pulse width signal $S_{pw}$ generated in process 204 is varied in response to the received second value of the input characteristic $C_{in}$. As a result, a second output characteristic value $C_{out2}$ is provided at the output in response to the second pulse width of process 206.

In other embodiments, a plurality of input characteristics $C_{in}$ received with each input characteristic $C_{in}$ being associated with one of a plurality of input devices 112. In this process, each of the input devices 112 is a different type of input device and generating the pulse width signal includes generating a pulse width that varies in response to two or more of the received input characteristics $C_{in}$.

In yet other embodiments, the pulse width signal $S_{pw}$ is utilized to generate a control signal $S_{con}$ as in process 216. The control signal $S_{con}$ is then utilized to generate or provide the appropriate output characteristic $C_{out}$.

As addressed in more detail above, in some embodiments the method can include generating a conversion feedback signal at the output, as in process 218. In this case, the pulse width signal $S_{pw}$ includes generating a pulse width that varies in response to the conversion feedback signal $FS_{conv}$ in process 206. Similarly, in some embodiments, the method can include generating an output control feedback signal at the output as in process 220. In this case, the output characteristic $C_{out}$ is provided in process 206 in response to the output control feedback signal $FS_{oc}$.

Additionally, it should be noted that the method can also include receiving the provided output characteristic and determining the operating characteristic within the operational environment. For example, the operating characteristic can be a temperature measured by a thermocouple. The input characteristic provided by the thermocouple is a voltage of the thermocouple. The device desired to be synthesized in an RTD that has a resistance that varies in response to the temperature. The method receives the voltage from the thermocouple and generates a pulse width signal that corresponds with the impedance of the RTD, had the RTD sensed the operating temperature sensed by the thermocouple. A temperature measurement instrument is adapted for interfacing to the particular type of RTD is coupled to the adaptor circuit to determine the provided output impedance provided by the adaptor circuit. The temperature measurement instrument then determines or calculates the sensed operating temperature in response to the determined impedance.

Figure 7:
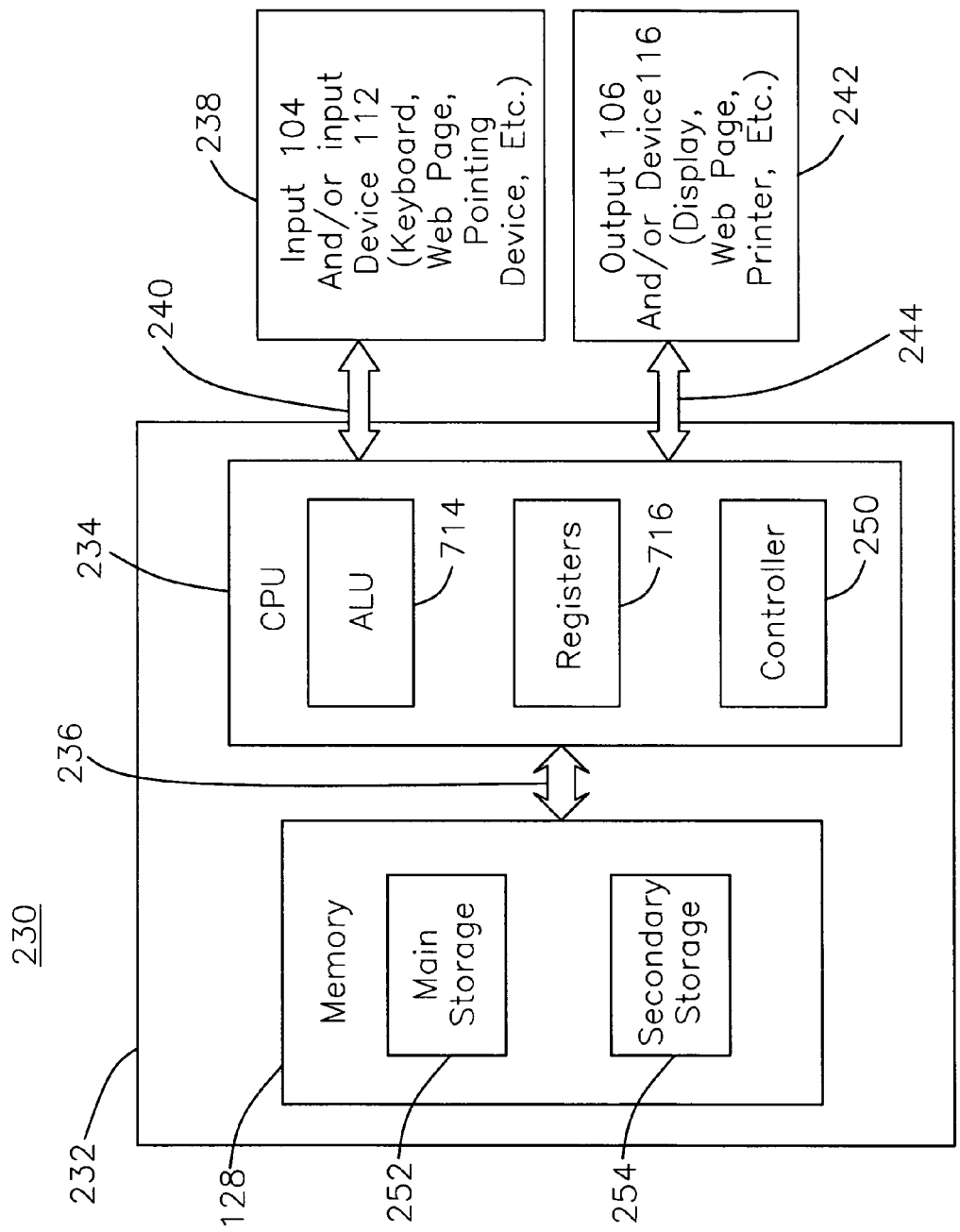
FIG. 7 is a block diagram of a processing system for a sensor adaptor according to some exemplary embodiments.

Referring now to FIG. 7, an operating environment for one or more illustrated embodiments of the adaptor assemblies, adaptor circuits and adaptor systems as described above can include a processing system 230 having a computer 232 that includes one or more high speed processors (such as a central processor unit (CPU) 234, in conjunction with a memory 128 interconnected with at least one bus structure 236, an input component 238 interconnected by an input structure 240, and an output component 242 interconnected by at least one output structure 244.

The illustrated processor 234 is of familiar design such as with many digital signal processors and can include an arithmetic logic unit (ALU) 246 for performing computations, a collection of registers 248 for temporary storage of data and instructions, and a controller 250 for controlling operation of the computer 232. Any of a variety of processors, including at least those from Digital Equipment, Sun, MIPS, Motorola/Freescale, NEC, Intel, Cyrix, AMD, Texas Instruments, HP, and Nexgen, is equally preferred for the processor 234. The illustrated embodiment operates on an operating system designed to be portable to any of these processing platforms.

The memory 128 generally includes high-speed main memory 252 in the form of a medium such as random access memory (RAM) and read only memory (ROM) semiconductor devices, and secondary storage 254 in the form of long term storage mediums such as floppy disks, hard disks, tape, CD-ROM, flash memory, and other devices that store data using electrical, magnetic, optical or other recording media. The main memory 252 also can include video display memory for displaying images through a display device. Those skilled in the art will recognize that the memory 128 can comprise a variety of alternative components having a variety of storage capacities and can be implemented with the processor 234.

The input component 238 and output component 242 are also familiar and can be implemented associated with the local and remote user interfaces as well as a controller, remote operational system and operations system, by way of example. The input device 238 can comprise the input device 104, as well as a keyboard, a mouse, a physical transducer (e.g. a microphone), etc. and is interconnected to the computer 232 via an input interface 240 of the processor 234, the latter for programming and operation of the computer 232. The output component 242 can include the output circuit 110 or can also include a display, a printer, a transducer (e.g. a speaker), and be interconnected to the computer 232 via an output interface 244. Some devices, such as a network adapter or a modem, can be used as input and/or output components.

As is familiar to those skilled in the art, the computer system 230 further includes an operating system and at least one application program. The operating system is the set of software which controls the computer system's operation and the allocation of resources. The application program is the set of software that performs a task desired by the user, using computer resources made available through the operating system. Both are resident in the illustrated memory 128. As known to those skilled in the art, some of the methods, processes, and/or functions described herein can be implemented as software and stored on various types of computer readable medium as computer executable instructions. In various embodiments of the adaptor circuit or assembly, the processor can include a robust operating and application program having the computer executable instructions for controlling the controller and the controlled devices. Additionally, it can include application software programs with computer executable instructions including a thin client application for communicating and interactively operating with one or more external devices by way of example.

In accordance with the practices of persons skilled in the art of computer programming, some embodiments as described herein with reference to symbolic representations of operations are performed by the computer system 230. Such operations are sometimes referred to as being computer-executed. It will be appreciated that the operations which are symbolically represented include the manipulation by the processor 234 of electrical signals representing data bits and the maintenance of data bits at memory locations in the memory 128, as well as other processing of signals. The memory locations where data bits are maintained are physical locations that have particular electrical, magnetic, or optical properties corresponding to the data bits. The adaptor circuit can be implemented in a program or programs, comprising a series of instructions stored on a computer-readable medium. The computer-readable medium can be any of the devices, or a combination of the devices, described above in connection with the memory 128.

It should be understood to those skilled in the art, that some embodiments of systems or components described herein may have more or fewer computer processing system components and still be within the scope of the present disclosure.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A temperature sensor adaptor assembly comprising:
   a conversion circuit configured for receiving an input characteristic of an input temperature sensor and generating a pulse width signal having a pulse width that varies in response to the received input characteristic;
   an impedance circuit coupled to the conversion circuit for receiving the pulse width signal, coupled to an output, and configured for providing an impedance at the output responsive to the pulse width of the received pulse width signal; and
   a conversion feedback circuit coupled to the output and to the conversion circuit and configured for generating a conversion feedback signal from the output, wherein the conversion circuit is configured for receiving the conversion feedback signal and for generating the pulse width signal having a pulse width responsive to the conversion feedback signal, and
   wherein the provided impedance at the output corresponds to an impedance of a synthesized temperature sensor that is different from the input temperature sensor.

2. The assembly of claim 1 wherein the input temperature sensor is a thermocouple and the input characteristic is a voltage generated by the thermocouple.

3. The assembly of claim 2 wherein the synthesized temperature sensor is an impedance-based temperature sensor.

4. The assembly of claim 3 wherein the impedance-based temperature sensor is selected from the group consisting of a resistance temperature detector (RTD) and a thermistor.

5. The assembly of claim 2, further comprising a cold junction compensation circuit coupled to the conversion circuit and configured for generating a compensation signal, wherein the conversion circuit is configured for generating the pulse width signal having a pulse width responsive to the compensation signal.

6. The assembly of claim 2 wherein the conversion circuit is configured for determining a temperature at a hot junction of the thermocouple in response to the received input characteristic and for generating the pulse width signal having a pulse width responsive to the determined temperature.

7. The assembly of claim 1 wherein the conversion circuit includes a processor and a computer readable medium having computer executable instructions configured for generating the pulse width signal.

8. The assembly of claim 1 wherein the impedance circuit includes an output control circuit configured for receiving the pulse width signal and generating an output control signal, and an impedance device configured for receiving the output control signal and varying the impedance at the output in response to the output control signal.

9. The assembly of claim 8 wherein the output control circuit includes a circuit selected from the group consisting of an operational amplifier and a linear filter, and is configured for generating a direct current voltage signal as the output control signal.

10. The assembly of claim 8 wherein the output control circuit is an operational amplifier configured for receiving the pulse width signal at an inverting input, further comprising an output control feedback circuit coupled to the output and to the output control circuit and configured for generating an output control feedback signal from the output, wherein the operational amplifier is configured for receiving the output control feedback signal at a non-inverting input.

11. The assembly of claim 8 wherein the output control circuit includes an integration circuit integrating the pulse width signal with at least one of a reference signal and an output control feedback signal.

12. The assembly of claim 8 wherein the impedance device includes a transistor having a gate for receiving the control signal and wherein the output impedance is provided across a drain and a source of the transistor in response to the gate receiving the control signal.

13. The assembly of claim 8, further comprising an output control feedback circuit coupled to the output and to the output control circuit and configured for generating an output control feedback signal from the output, wherein the output control circuit is configured for generating the output control signal responsive to the output control feedback signal.

14. The assembly of claim 13, further comprising a conversion feedback circuit coupled to the output and to the conversion circuit and configured for generating a conversion feedback signal from the output, wherein the conversion circuit is configured for receiving the conversion feedback signal and generating the pulse width signal having a pulse width responsive to the conversion feedback signal.

15. The assembly of claim 1 wherein the conversion circuit is configured for determining a sensed temperature in response to the received input characteristic and for generating the pulse width signal having a pulse width responsive to the sensed temperature.

16. The assembly of claim 15 wherein the conversion circuit is configured to generate the pulse width signal having a pulse width corresponding to the impedance of the synthesized temperature sensor detecting the sensed temperature.

17. The assembly of claim 1 wherein the conversion circuit is configured for generating the pulse width signal having a substantially constant pulse rate.

18. The assembly of claim 1 wherein the conversion circuit is configured for receiving a plurality of input characteristics, each received from one of a plurality of input temperature sensors, and for generating the pulse width signal having a pulse width responsive to two or more of the received input characteristics.

19. The assembly of claim 18 wherein the conversion circuit is configured for determining the impedance of the synthesized temperature sensor in response to two or more of the input characteristics and for generating the pulse width signal having a pulse width responsive to the determined synthesized impedance.

20. The assembly of claim 19 wherein the two or more input characteristics are two or more voltages received from two or more different types of thermocouples.

21. A temperature sensor adaptor system comprising:
an input for receiving an electrical signal from a thermocouple;
an output for coupling to an input of a temperature measurement instrument, the temperature measurement instrument being configured for receiving an input from an impedance temperature sensor for determining a sensed temperature;
a processor coupled to the input for receiving the electrical signal, the processor configured for generating a pulse width signal having a pulse width that varies in response to the received electrical signal;
a control circuit coupled to the processor and configured for receiving the pulse width signal and converting the pulse width signal into a control signal responsive to the pulse width of the received pulse width signal;
an impedance device coupled to the control circuit for receiving the control signal and configured for providing an impedance at the output responsive to the control signal, wherein the provided impedance corresponds to an impedance of an impedance-based temperature sensor; and
an output control feedback circuit coupled to the output and to the control circuit and configured for generating an output control feedback signal from the output, wherein the control signal is responsive to the output control feedback signal.

22. The system of claim 21, further comprising a cold junction compensation circuit coupled to the processor and configured for generating a compensation signal associated with a cold junction of the thermocouple, the processor being configured for receiving the compensation signal and for generating the pulse width signal having a pulse width that varies in response to the compensation signal.

23. The system of claim 21, further comprising a computer readable medium associated with the processor and having computer executable instructions configured for determining a temperature associated with the receiving electrical signal and generating the pulse width signal having a pulse width that varies in response to the determined temperature.

24. The system of claim 21, further comprising a conversion feedback circuit coupled to the output and to the processor and configured for generating a conversion feedback signal from the output, wherein the processor is configured for generating the pulse width signal having a pulse width that varies in response to the conversion feedback signal.

25. A temperature sensor adaptor circuit comprising:
means for converting an input characteristic received at an input from a temperature sensor configured for sensing a temperature into a pulse width signal having a pulse width that varies in response to the received input characteristic;
means for providing an output characteristic at an output corresponding to a characteristic of a synthesized temperature sensor and responsive to the pulse width of the pulse width signal, said synthesized temperature sensor being different from the input temperature sensor; and
means for generating an output control feedback signal from the output, wherein the means for providing is responsive to the output control feedback signal.

26. The circuit of claim 25, further comprising means for generating a conversion feedback signal from the output, wherein the means for converting includes means for generating the pulse width signal having a pulse width that varies in response to the conversion feedback signal.

27. The circuit of claim 25, further comprising means for generating a conversion feedback signal from the output, wherein the means for converting includes means for generating the pulse width signal having a pulse width that varies in response to the conversion feedback signal.

28. The circuit of claim 25 wherein the means for converting includes means for receiving a plurality of input characteristics from a plurality of input sensors each configured for sensing an operating characteristic and means for generating a pulse width signal having a pulse width that varies in response to two or more of the received input characteristics.

29. A method of sensing a temperature comprising:
receiving a voltage generated by a thermocouple sensing an operating temperature;
generating a pulse width signal having a pulse width that varies in response to the received voltage;
providing an impedance at an output that varies in response to the pulse width of the pulse width signal and that corresponds to an impedance of an impedance-based temperature sensor sensing the operating temperature; and
generating an output control feedback signal from the output, wherein providing the output impedance includes providing the impedance responsive to the output control feedback signal.

30. The method of claim 29, further comprising generating a conversion feedback signal from the output, wherein generating the pulse width signal includes generating a pulse width that varies in response to the conversion feedback signal.

31. The method of claim 29 wherein providing the output impedance includes receiving the pulse width signal and generating a control signal responsive to the pulse width of the received pulse width signal; further comprising receiving the control signal at an impedance device coupled to the output and configured for varying the impedance at the output in response to the control signal.

32. The method of claim 31, further comprising receiving an output reference signal associated with the output, wherein the generating the control signal includes integrating the pulse width signal with the output reference signal.

33. The method of claim 29, further comprising receiving a compensation signal from a cold junction compensation circuit, wherein generating the pulse width signal includes generating a pulse width of the pulse width signal that varies in response to the received compensation signal.

34. The method of claim 29 wherein the received voltage has a first voltage value, the pulse width has a first pulse width, and the output impedance has a first output impedance value, further comprising:
receiving the voltage having a second voltage value from the thermocouple;
generating the pulse width signal having a second pulse width that varies in response to the second voltage value; and
providing a second impedance at the output responsive to the second pulse width.

35. The method of claim 29, further comprising measuring the output impedance and calculating the temperature in response to the measured output impedance.

36. The method of claim 29 wherein receiving includes receiving a plurality of voltages, each generated by one of a plurality of thermocouples and wherein generating the pulse width signal includes generating a pulse width that varies in response to two or more of the received voltages.

37. The method of claim 36 wherein two or more of the thermocouples are of different thermocouple types.

* * * * *